Dec. 9, 1952　　L. E. W. MONTROSE-OSTER　　2,621,057
SUSPENSION SYSTEM FOR VEHICLES
Filed May 24, 1946　　　　　　　　　　　　　　4 Sheets-Sheet 1
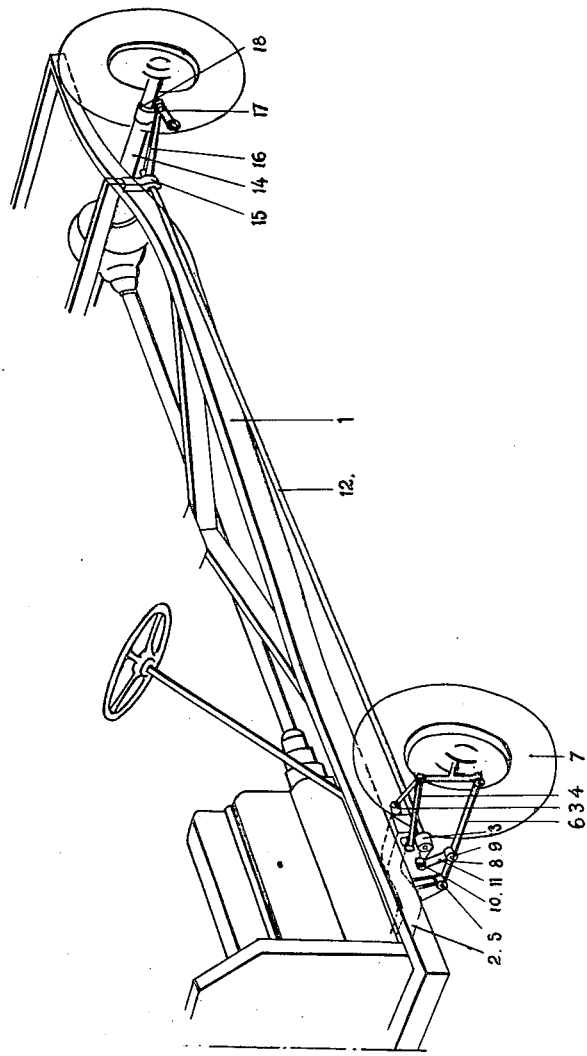
FIG. I.
Inventor
Louis Eugene Widolt Montrose-Oster
By
Emery Holcombe & Blair
Attorney Dec. 9, 1952     L. E. W. MONTROSE-OSTER     2,621,057
SUSPENSION SYSTEM FOR VEHICLES
Filed May 24, 1946     4 Sheets-Sheet 2
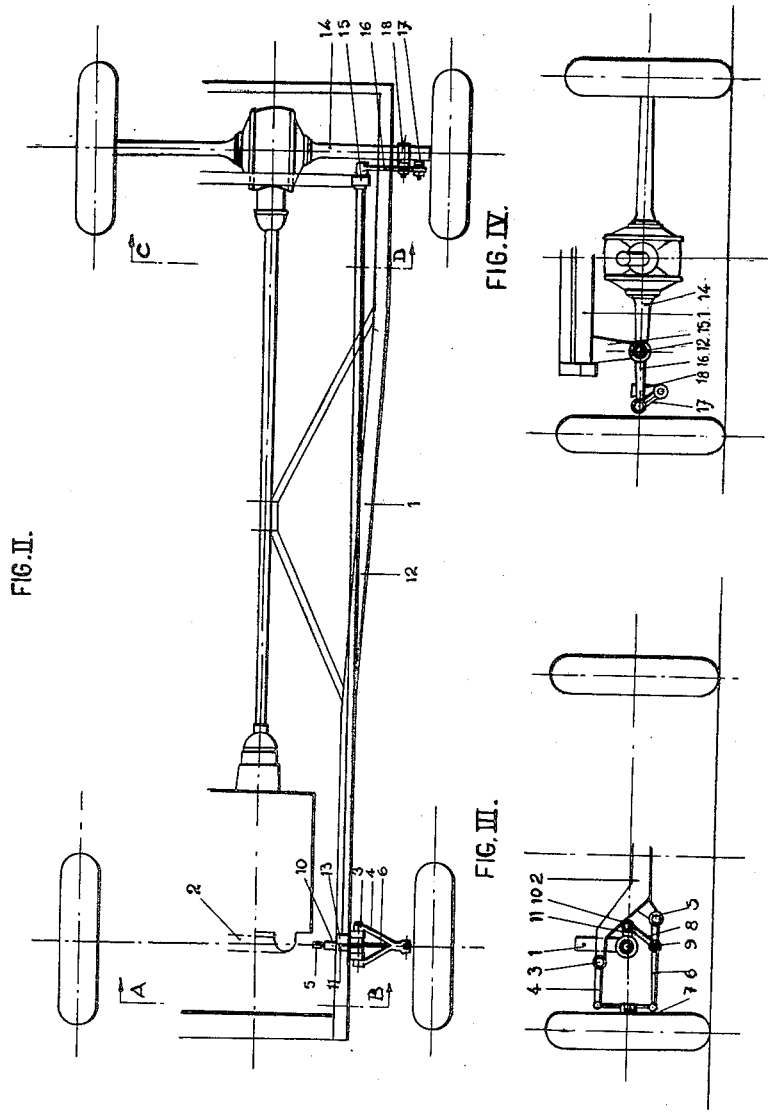
Inventor
Louis Eugene Widolf Montrose-Oster
By
Emery, Holcombe & Blair
Attorney

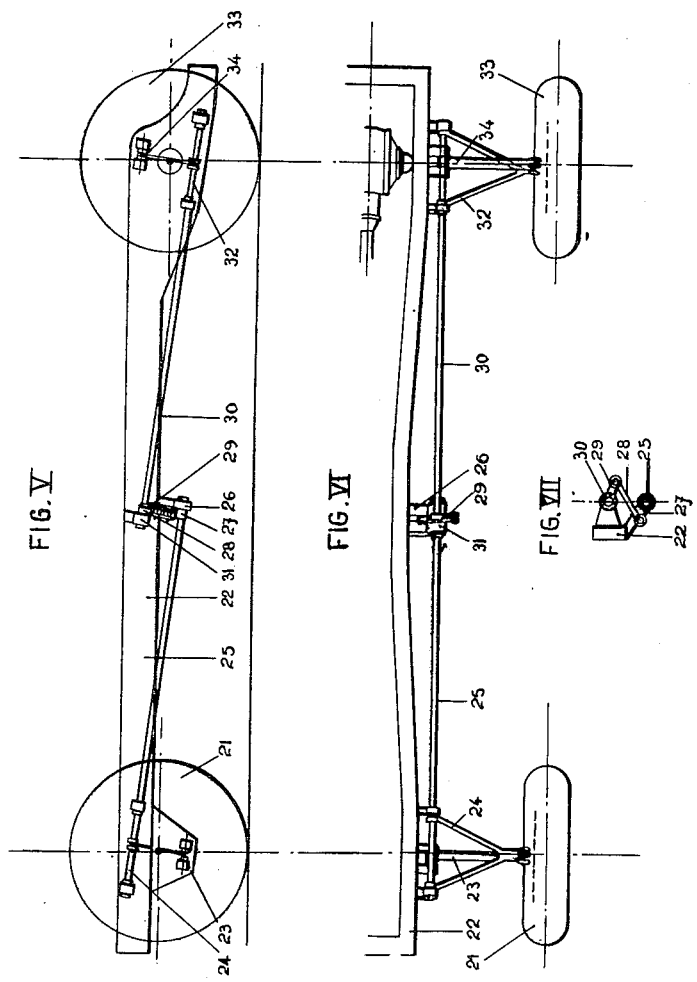

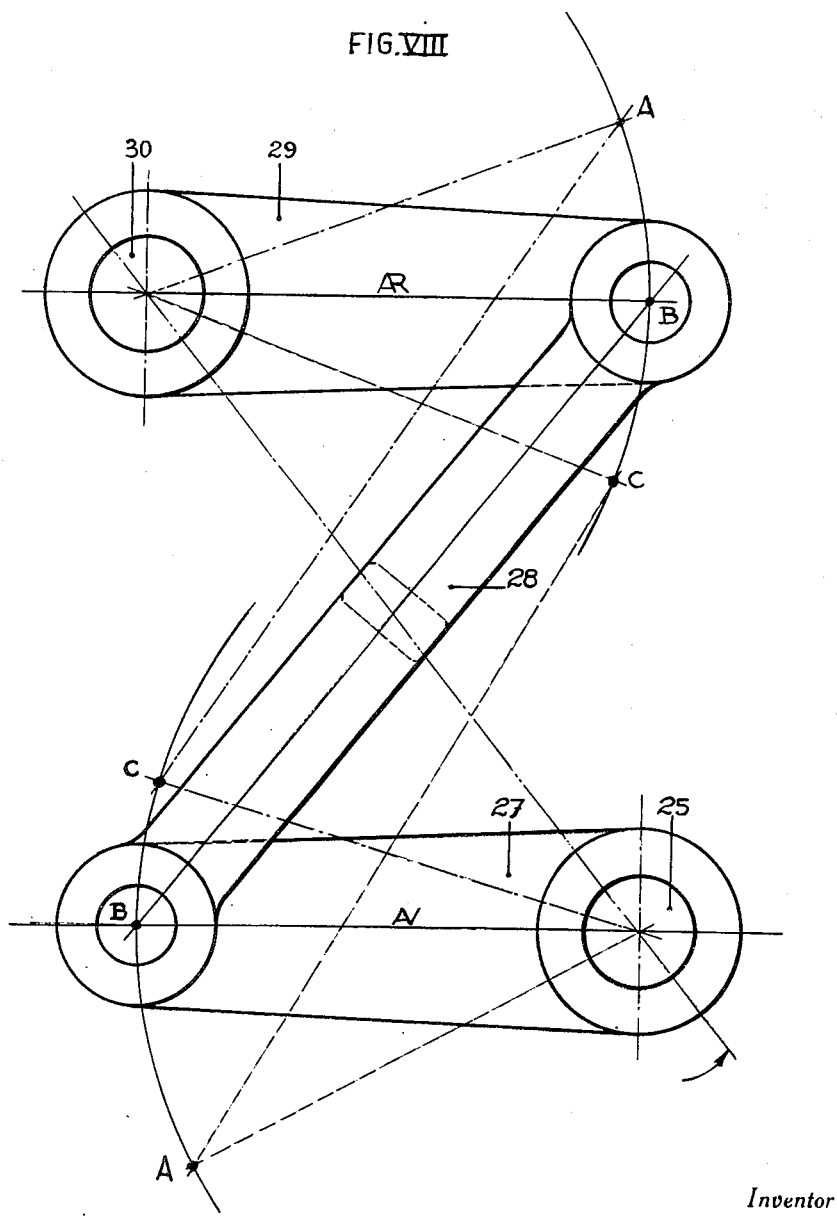

Patented Dec. 9, 1952

2,621,057

UNITED STATES PATENT OFFICE 2,621,057

SUSPENSION SYSTEM FOR VEHICLES

Louis Eugène Widolt Montrose-Oster, Brussels, Belgium, assignor of one-half to Pollopas Patents Limited, London, England, a British company Application May 24, 1946, Serial No. 672,056
In France December 29, 1943

Section 1, Public Law 690, August 8, 1946
Patent expires December 29, 1963

3 Claims. (Cl. 280—104)

This invention relates to a self-stabilising resilient conjugate suspension system for vehicles which move mainly in one direction and have four effective or virtual suspension points. A suspension system of this character is disclosed in my copending application Serial Number 672,055 filed May 24, 1946, now Patent 2,563,261, in which the interconnection between two conjugate wheels acts at the same time both as a connecting element and as a resilient member, and is constituted by torsion bars in the arrangements therein described.

According to one feature of the present invention, the restoring couples ensuring the stability of the chassis about its transverse axis are produced, as a function of the angle between the plane of the chassis and that of the running surface, according to a falling characteristic curve of the action of the wheels upon the torsion bars and a preferably slightly rising characteristic curve of the reaction of the bars against the action of the wheels. These characteristics are obtained by a judicious choice of the lengths of the small connecting rods and of the values of the angles between the different elements of the devices connecting each wheel to the corresponding resilient member.

Thus, a single torsion bar may act as resilient member for the wheels at the same side of an automobile vehicle, and may conjugate, for instance, the stresses of an independently-mounted front wheel and of a rear wheel forming part of a rear axle. Any interconnection between the two lateral conjugate arrangements can be dispensed with.

According to another feature of the present invention, the devices ensuring the aforesaid characteristics, instead of being placed between the wheels and the resilient member, are arranged centrally, in the neighborhood of the middle of the resilient member which in this case, must, of course, be divided into two. This construction allows of the bars being made integral with the lever supports of the wheel spindle carriers, which has appreciable advantages in certain cases.

In the case of such a modification, it is naturally possible to replace the bars by other resilient elements for instance, leaf springs fitted in accordance with the principles of the invention, or again, to employ a combination of torsion bar and leaf spring which constitutes a still further modification.

The accompanying drawings diagrammatically illustrate, by way of example, three embodiments of conjugate suspension according to the invention, applied to automobile vehicle chassis. In the drawings, Fig. 1 is a perspective view of half a chassis having independently-mounted front wheels and a rear axle fitted with one embodiment of the new suspension. Fig. 2 is a plan view, and Figs. 3 and 4 represent sections on A—B and C—D of Fig. 2, looking from the front of the chassis towards the rear, i. e., against the running direction.

Figs. 5 and 6 show an elevation and a plan view respectively of half a chassis fitted with another embodiment of the suspension according to the present invention. Figs. 7 and 8 illustrate on a small and a large scale respectively, the central device employed in this embodiment, which produces the stabilising couples.

In the drawings, the parts of the new suspension are depicted in heavy lines, other parts such as the chassis, axles, wheels, motor, radiator, steering wheel, being indicated in light lines. Also, in order to facilitate the understanding of Figs. 1 to 4, the various axle guide members which form no part of the present invention are not represented.

In the embodiment illustrated in Figs. 1 to 4 the cross member 2 of the chassis 1 supports the joints 3 and 5 of the triangular upper lever 4 and simple lower lever 6 respectively. The spindle carrier of the front wheel 7 is linked to the two levers 4 and 6.

A small connecting rod 8 is linked at one end 9 to the lever 6 and at the other end 10 to a lever 11 keyed on a torsion bar 12, the front part of which is guided by a bearing 13 integral with the cross member 2. The torsion bar is guided, in the neighborhood of the rear axle 14, by a bearing 15 integral with the chassis 1. A lever 16 keyed on the extremity of the torsion bar 12 is connected to the rear axle 14 through a link 17 attached to a collar 18 fast on the rear axle.

As Figs. 2 to 4 indicate, the two sides of the chassis are provided with similar members.

As stability about the transverse axis is obtained exclusively by a restoring or stabilising couple produced as a function of the inclination of the chassis about that axis, no additional restoring or stabilising device need be provided. As a vehicle provided with such suspension is free from galloping movement, no device for opposing such movement need be provided. The result is that the practical embodiment is quite simple. In fact, it requires only two torsion bars extending preferably from the front to the rear of the chassis.

However, cases occur when for certain reasons it may be desired to make the torsion bar integral with a lever support for a front wheel, or rear wheel, or both. As in such case it is impossible to interpose the devices producing the stabilising couples between the levers and the torsion bars, they are positioned at a central point near the middle of each bar which, in such case, must be divided into or replaced by two bars.

Figs. 5 to 8 illustrate an example of construction in such a case. The spindle carriers of the front independently-mounted wheels 21 are linked to the chassis 22 by means of a lower simple lever 23 and a triangular upper lever 24. A torsion bar 25 rigid with the lever 24 or with its spindle extends to about half way between the front and rear wheels, where it is guided by a bearing 26 rigid with the chassis 22. A lever 27 keyed to the bar 25 operates, through a link 28, a similar lever 29 rigid with a torsion bar 30 which is guided at its front part by the bearing 31 and at its rear end is rigid with the lower triangular lever 32 (or its spindle) of the spindle carrier of the rear wheel 33. The latter spindle carrier is also linked to the chassis by means of a simple upper lever 34.

The enlarged view of the device in Fig. 8 clearly shows the production of the stabilising couple, the positions A, B, C of one lever corresponding to the positions C, B, A of the other lever, and vice versa.

For the rigid link 28 as shown in Figs. V to VIII a tension spring may be substituted as disclosed in my application Serial No. 672,057, filed May 24, 1946, without departing from the principle of the invention.

The invention is susceptible of numerous constructional modifications, besides the embodiments above described by way of non-limitative examples. As applied to automobile vehicles, the invention may be utilised equally well for front-wheel drive vehicles as for rear-wheel drive vehicles.

I claim:
1. In a vehicle adapted to move mainly in one running direction and comprising a chassis supported on wheels at four supporting points, two at each longitudinal side of the chassis disposed one at the front end and the other at the rear end of the chassis, a resilient conjugate self-stabilizing suspension system comprising two resilient conjugate suspensions, one at each longitudinal side of the chassis, each of said two conjugate suspensions being independent of the other, and each including two levers fulcrumed to the chassis respectively at the front and rear supporting points at the same side of the chassis, the pair of levers at the same side of the chassis extending laterally in opposite directions from their respective fulcrums, a plurality of wheel-supporting means each supporting a wheel, links connecting the free extremities of said levers respectively to the adjacent wheel-supporting means, means including torsion spring means extending longitudinally of the chassis and to the ends of which said levers are secured, said torsion means resiliently and mechanically interconnecting said levers in such manner that vertical displacements in like sense of the front and rear wheels relative to the chassis apply opposed torsional leverage to said torsion spring means, the angles between each link and its connected lever being other than a right-angle and the arrangement being such that one of said angles at a displaced end tends to depart further from a right-angle and the other of said angles tends to approach more nearly to a right angle under increasing static load upon said end.

2. In a vehicle adapted to move mainly in one running direction and comprising a chassis supported on wheels at four supporting points, two at each longitudinal side of the chassis disposed one at the front end and the other at the rear end of the chassis, a resilient conjugate self-stabilizing suspension system comprising two resilient conjugate suspensions, one at each longitudinal side of the chassis, each of said two conjugate suspensions being independent of the other, and each including two rigid levers fulcrumed at the front and rear supporting points at the same side of the chassis, means including torsion spring means extending longitudinally of the chassis and resiliently and mechanically interconnecting said levers, one of said levers being directed inwardly from its fulcrum point and the other of said levers being directed outwardly from its fulcrum point, rigid links extending downwardly from the free extremities of said levers at acute angles thereto and connecting said extremities respectively to adjacent wheel-supporting means, the arrangement being such that the angle between each link and its connected lever becomes more acute under increasing static load.

3. In a vehicle adapted to move mainly in one running direction, the combination of a chassis supported on wheels at four supporting points, two at each longitudinal side of the chassis disposed one at the front end and the other at the rear end of the chassis, torsion bars rotatably carried by said chassis and extending longitudinally thereof between the two supporting points at each side of said chassis, rigid levers fast on the four ends of said bars, two of said levers at one end of the chassis being directed outwardly from their associated bars, and the other two of said levers at the other end of said chassis being directed inwardly from their associated bars, rigid links extending downwardly from the free extremities of said levers and at acute angles thereto and connecting the extremities of said levers to the adjacent wheel-support means, the arrangement being such that said angles become more acute under increasing static load.

LOUIS EUGÈNE WIDOLT
MONTROSE-OSTER.

REFERENCES CITED

The following references are of record in the file of this patent:

UNITED STATES PATENTS

| Number | Name | Date |
| --- | --- | --- |
| 1,089,257 | Park et al. | Mar. 3, 1914 |
| 1,142,468 | Wemp | June 8, 1915 |
| 1,655,227 | Hyde | Jan. 3, 1928 |
| 1,719,767 | Hyde | July 2, 1929 |
| 2,165,033 | Dauben | July 4, 1939 |
| 2,333,008 | Holmstrom et al. | Oct. 26, 1943 |
| 2,416,388 | Hendrix | Feb. 25, 1947 |